US010785023B2

(12) United States Patent
Ju et al.

(10) Patent No.: US 10,785,023 B2
(45) Date of Patent: Sep. 22, 2020

(54) APPARATUS AND METHOD FOR MANAGING METERING INFORMATION

(71) Applicant: ELECTRONICS AND TELECOMMUNICATIONS RESEARCH INSTITUTE, Daejeon (KR)

(72) Inventors: Hong-Il Ju, Daejeon (KR); Young-Ho Kim, Daejeon (KR); Yun-Kyung Lee, Daejeon (KR); Bo-Heung Chung, Daejeon (KR); Jeong-Nyeo Kim, Daejeon (KR); Jae-Deok Lim, Sejong-si (KR)

(73) Assignee: ELECTRONICS AND TELECOMMUNCATIONS RESEARCH INSTIITUTE, Daejeon (KR)

( * ) Notice: Subject to any disclaimer, the term of this patent is extended or adjusted under 35 U.S.C. 154(b) by 207 days.

(21) Appl. No.: 15/996,802

(22) Filed: Jun. 4, 2018

(65) Prior Publication Data
US 2019/0132124 A1 May 2, 2019

(30) Foreign Application Priority Data
Nov. 1, 2017 (KR) ........................ 10-2017-0144490

(51) Int. Cl.
H04L 21/00 (2006.01)
H04L 9/08 (2006.01)
(Continued)

(52) U.S. Cl.
CPC ............ *H04L 9/0866* (2013.01); *G06F 21/44* (2013.01); *G06F 21/602* (2013.01);
(Continued)

(58) Field of Classification Search
CPC ...... G06F 21/44; G06F 21/602; G06F 21/606; G06F 21/73; G06F 2221/2117; H04L 2209/805; H04L 63/04; H04L 63/0435; H04L 63/068; H04L 9/0825; H04L 9/0866; H04L 9/0894; H04L 9/3242;
(Continued)

(56) References Cited

U.S. PATENT DOCUMENTS 9,503,891 B2   11/2016   Yun et al.
9,509,516 B2   11/2016   Cho et al.
(Continued)

FOREIGN PATENT DOCUMENTS

JP   2013-003837 A    1/2013
KR   10-1317806 B1   10/2013
(Continued)

Primary Examiner — Joseph P Hirl
Assistant Examiner — Ka Shan Choy
(74) Attorney, Agent, or Firm — LRK Patent Law Firm

(57) ABSTRACT

An apparatus and method for managing meter data. The apparatus for managing meter data includes a metering unit for acquiring meter data from a target device based on time information; a communication unit for receiving a message including the time information from a server device and transmitting the meter data to the server device; and a security unit for creating a private key using the time information and encrypting the meter data using the private key.

16 Claims, 10 Drawing Sheets

(51) Int. Cl.
  *G06F 21/60* (2013.01)
  *G06F 21/73* (2013.01)
  *G06F 21/44* (2013.01)
  *H04L 9/32* (2006.01)
  *H04L 29/06* (2006.01)

(52) U.S. Cl.
  CPC ............ *G06F 21/606* (2013.01); *G06F 21/73* (2013.01); *H04L 9/0825* (2013.01); *H04L 9/0894* (2013.01); *H04L 9/3242* (2013.01); *H04L 63/04* (2013.01); *H04L 63/068* (2013.01); *G06F 2221/2117* (2013.01); *H04L 2209/805* (2013.01)

(58) Field of Classification Search
  CPC ........... H04W 12/001; H04W 12/0403; H04W 12/1008; H04W 4/70
  See application file for complete search history.

(56) References Cited

U.S. PATENT DOCUMENTS

| | | | |
|---|---|---|---|
| 2015/0382187 A1* | 12/2015 | Kruglick | ................ H04L 63/18 380/44 |
| 2016/0182233 A1 | 6/2016 | Go et al. | |
| 2017/0019248 A1* | 1/2017 | Mustafa | ................ H04L 9/008 |

FOREIGN PATENT DOCUMENTS

| KR | 10-1349301 B1 | 1/2014 |
|---|---|---|
| KR | 10-1380868 B1 | 4/2014 |
| KR | 10-2014-0110395 A | 9/2014 |
| KR | 10-1621931 B1 | 5/2016 |

\* cited by examiner

APPARATUS AND METHOD FOR MANAGING METERING INFORMATION

CROSS REFERENCE TO RELATED APPLICATION

This application claims the benefit of Korean Patent Application No. 10-2017-0144490, filed Nov. 1, 2017, which is hereby incorporated by reference in its entirety into this application.

BACKGROUND OF THE INVENTION

1. Technical Field

The present invention relates generally to Internet-of-Things (IoT) technology, smart grid technology, and remote metering technology, and more particularly to a meter data management method for encrypting, storing, and transmitting data in a remote metering service in an IoT environment or a smart grid environment.

2. Description of Related Art

In an IoT environment, various kinds of IoT devices are connected with each other, thereby forming a network. Here, IoT devices in the lowest layer may transmit data sensed by themselves to a server in the highest layer, and the server in the highest layer processes data received from the multiple IoT devices, thereby providing an IoT service.

Therefore, only when the data sensed by the IoT devices in the lowest layer are securely transmitted to the server in the highest layer via multiple networks may the desired IoT service be securely provided in the IoT environment.

In order to securely provide an IoT service, security functions, such as mutual authentication between IoT devices, encryption of data, and the like, are necessary. For example, data may be encrypted using a symmetric key cryptography algorithm in which a private key is shared in advance between a device in the lowest layer and a device in the highest layer. Alternatively, in the state in which a private key is not shared in advance, the private key may be exchanged using a public key cryptography algorithm or a key exchange algorithm, and data may be encrypted using the shared private key.

Also, because a security method using hardware may provide stronger security functions than a security method using software, a hardware security chip may be used. However, the security method using hardware may incur additional costs for hardware security chips, and it is difficult to apply the same to existing IoT devices.

Furthermore, the security methods using software or hardware are problematic in that the server in the highest layer is required to store and manage multiple private keys that are identical to the private keys of IoT devices in the lowest layer in order to decrypt data, encrypted and transmitted by the respective IoT devices.

Recently, such security functions are required for a remote metering service, in which electricity information is exchanged in real time in order to charge for electricity consumption.

The remote metering service is configured such that information about electricity is exchanged in real time, departing from merely checking electricity consumption using unidirectional communication, whereby electric meters may be controlled and information about electricity consumption may be provided to an electricity supply service provider.

Here, the remote metering service may be provided in a smart grid environment, and the electricity supply service provider may remotely read meter data using a wired and wireless communication network without the need for a meterman to personally visit a user's place in order to read an electric meter.

However, such a remote metering service may cause a security problem.

Particularly, information about the amount of electricity, gas, water, hot water, and heating energy used by a person may be sensitive information from which private information may be inferred. When such private information is leaked or exposed to third parties, it may constitute an invasion of privacy.

Also, when incorrect control information and falsified meter data are transmitted to an electricity supply service provider, the remote metering service may cause a big problem.

Meanwhile, Korean Patent No. 10-1317806, titled "Apparatus and method for encrypting meter data in advanced metering infrastructure", relates to an apparatus and method for encrypting data in a smart grid environment and a system for the same, and discloses an apparatus and method for providing security by encrypting meter data in a smart grid environment and a system for the same.

SUMMARY OF THE INVENTION

An object of the present invention is to guarantee end-to-end security between a device in the lowest layer and a device in the highest layer and to prevent information from being leaked to third parties.

Another object of the present invention is to enable a device in the lowest layer to encrypt sensitive and important data, such as private information and the like, before the data are stored, and to transmit the encrypted data to a device in the highest layer, whereby data stored in the devices may be securely protected.

A further object of the present invention is to provide secure encryption and decryption functions in the state in which a device in the highest layer does not manage keys for respective devices in the lowest layer.

Yet another object of the present invention is to securely protect meter data using a private key that is newly created in response to a request by a device in the highest layer and to optimally acquire meter data using an updated metering interval.

In order to accomplish the above objects, a method for managing meter data, in which a meter data management apparatus is used, according to an embodiment of the present invention includes acquiring first time information by decrypting an encrypted message received from a server device; acquiring meter data from a target device using the first time information; creating a first private key using the first time information; encrypting the meter data using the first private key; acquiring second time information by decrypting an encrypted metering request message, which is received from the server device; and transmitting the meter data based on the first time information and the second time information to the server device.

Here, acquiring the first time information may be configured such that the meter data management apparatus creates a registration request message that includes an identifier thereof and transmits the registration request message to the server device, and such that the server device creates an initial private key that is identical to an initial private key stored in advance in the meter data management apparatus using the identifier included in the registration request message.

Here, acquiring the first time information may be configured to create the encrypted registration completion message in which the first time information is encrypted using the initial private key.

Here, acquiring the first time information may be configured such that the server device creates the registration completion message so as to include a metering period of the first time information, which is created based on at least one of an amount of memory in a device for storing meter data and a change in usage by the target device.

Here, acquiring the meter data may be configured to acquire the meter data from the target device from a metering start time of the first time information.

Here, creating the first private key may be configured such that the meter data management apparatus and the server device create the same first private key by taking the first time information as input.

Here, creating the first private key may be configured to create the first private key by taking the metering period and the metering start time of the first time information as input.

Here, acquiring the second time information may be configured such that the server device creates the metering request message in which a metering period and a metering request time of the second time information are encrypted using the first private key.

Here, acquiring the second time information may be configured such that the server device creates the metering request message so as to include the metering period of the second time information, which is created based on at least one of the amount of memory in the device for storing meter data and the change in usage by the target device.

Here, acquiring the second time information may be configured such that the meter data management apparatus selects the metering period of the second time information when a metering period is determined to be changed as a result of comparison of the metering period of the first time information with that of the second time information.

Here, transmitting the meter data may be configured to transmit the meter data read from the metering start time of the first time information to the metering request time of the second time information.

Also, in order to accomplish the above objects, a method for managing meter data, in which a meter data management apparatus is used, according to an embodiment of the present invention includes acquiring time information by decrypting an encrypted message received from a server device; transmitting first meter data of a target device to the server device based on the time information; creating a private key using the time information; and encrypting second meter data using the private key.

Here, acquiring the time information may be configured such that the server device creates the encrypted message including the time information using an initial private key and transmits the encrypted message to the meter data management apparatus and such that the meter data management apparatus acquires the time information by decrypting the encrypted message using an initial private key stored in advance, which is identical to the initial private key created by the server device.

Here, acquiring the time information may be configured such that the server device creates the encrypted message so as to include a metering period of the time information, which is created based on at least one of an amount of memory in a device for storing meter data and a change in usage by the target device.

Here, transmitting the first meter data may be configured to transmit the first meter data, read by a metering request time of the time information, to the server device.

Here, creating the private key may be configured to acquire the second meter data from the target device using the metering period of the time information when a metering period is determined to be changed as a result of comparison of the metering period of the time information with a metering period that is used when the first meter data are acquired.

Here, creating the private key may be configured to create the private key by taking as input at least one of the metering period and the metering request time of the time information.

Here, encrypting the second meter data may be configured to encrypt the second meter data, which are acquired from the target device after the private key is created, using the private key.

Here, the method may further include decrypting, by the server device, the first meter data using the private key after creating the private key, and decrypting the first meter data may be configured to provide a metering service to users using the first meter data.

Also, in order to accomplish the above objects, an apparatus for managing meter data according to an embodiment of the present invention includes a metering unit for acquiring meter data from a target device based on time information; a communication unit for receiving a message including the time information from a server device and transmitting the meter data to the server device; and a security unit for creating a private key using the time information and encrypting the meter data using the private key.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
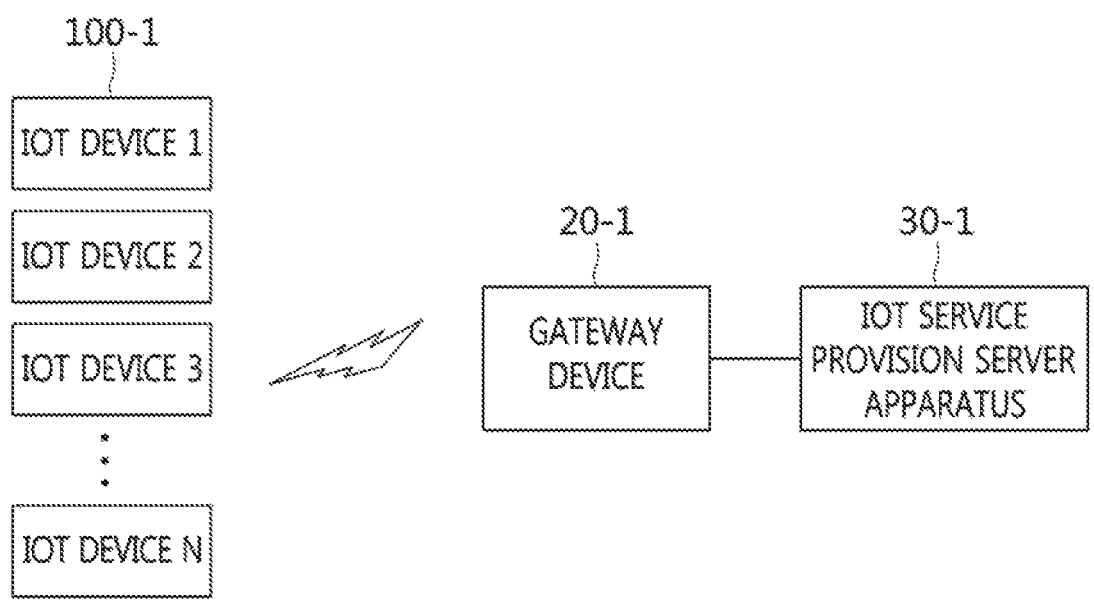
FIG. 1 is a view that shows a remote metering service in an IoT environment according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

For the convenience of description, an apparatus and method for managing meter data according to an embodiment of the present invention may be described by illustrating a remote metering service in an IoT environment or a remote metering service using smart meters in a smart grid environment as an example. However, the present invention is not limited to a remote metering service in an IoT environment or in a smart grid environment, and the present invention may be applied to various systems and services, such as data management services, remote metering services, and metering management systems.

Hereinafter, a preferred embodiment of the present invention will be described in detail with reference to the accompanying drawings.

FIG. 1 is a view that shows a remote metering service in an IoT environment according to an embodiment of the present invention.

Referring to FIG. 1, a remote metering service in an IoT environment according to an embodiment of the present invention may be configured such that IoT devices 100-1 in the lowest layer may be connected with an IoT service provision server device 30-1 via a gateway device 20-1.

Here, the IoT devices 100-1 may be directly connected with the IoT service provision server device 30-1 in the highest layer without a relay device, such as the gateway device 20-1 or the like, therebetween.

The IoT devices 100-1 in the lowest layer and the gateway device 20-1 having various wireless communication functions (Wi-Fi, Zigbee, BLE, and the like) may form a local network in most IoT environments.

Here, the IoT service provision server device 30-1 may be connected with the gateway device 20-1 through wired and wireless communication.

The IoT devices 100-1 may communicate with each other, and may transmit sensing data (meter data) when a request to transmit data is made by the IoT service provision server device 30-1.

Here, the IoT devices 100-1 may sense data using information provided by the IoT service provision server device 30-1.

Here, the data may be various kinds of data that are required to be read because the values thereof change in real time, such as the amount of electricity consumed by the IoT devices or the like.

Here, the IoT devices 100-1 may encrypt sensing data using information provided by the IoT service provision server device 30-1 and transmit the encrypted sensing data to the IoT service provision server device 30-1.

The IoT service provision server device 30-1 may decrypt the received encrypted data.

Here, the IoT service provision server device 30-1 may provide users with an IoT service based on the decrypted data.

The IoT devices 100-1 may include meter data storage for storing sensing data, or may have a minimal amount of memory when not including meter data storage.

The gateway device 20-1 may include meter data storage for storing data received from the IoT devices 100-1, or may have a minimal amount of memory when it does not include meter data storage.

Figure 2:
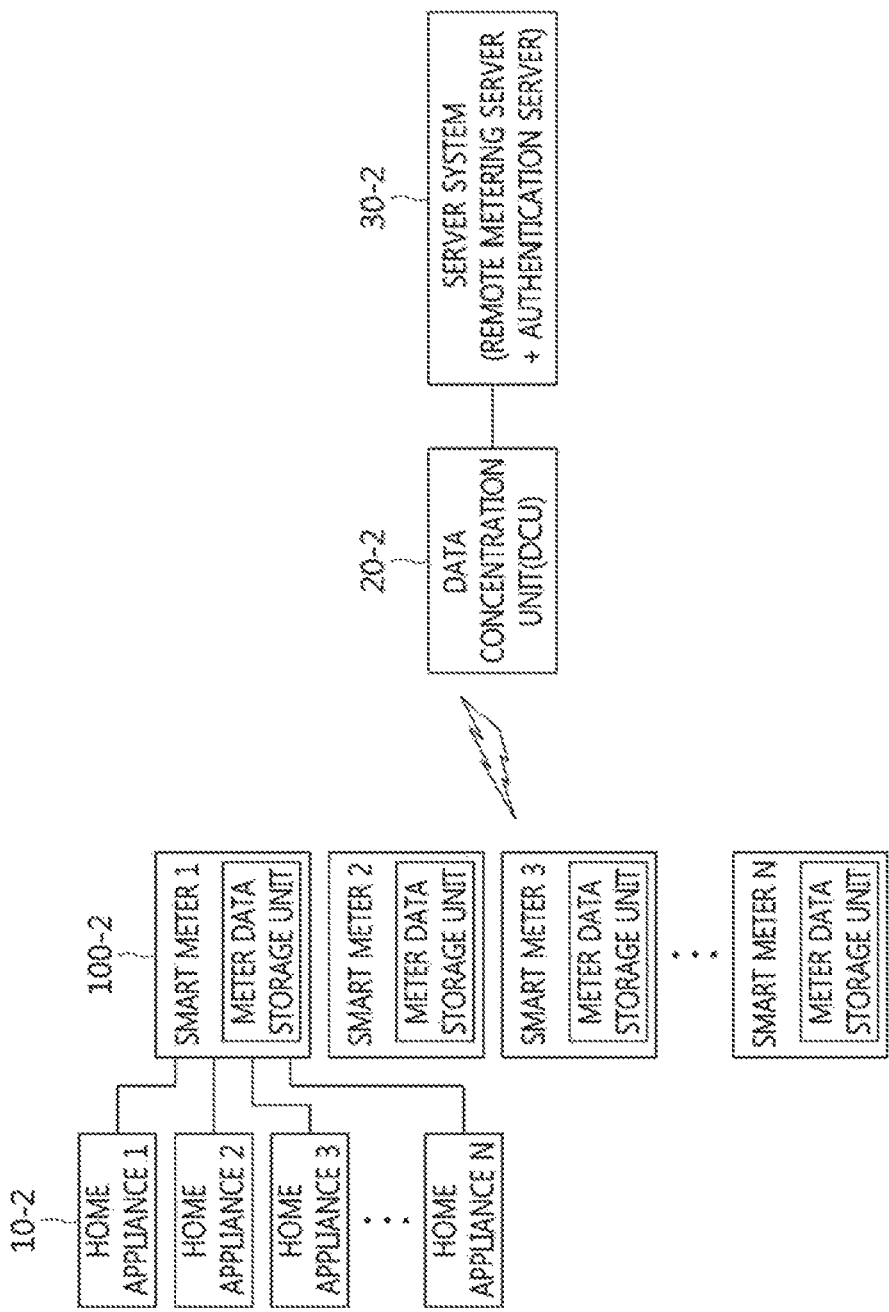
FIG. 2 is a view that shows a remote metering service using a smart meter that stores meter data according to an embodiment of the present invention.
Figure 3:
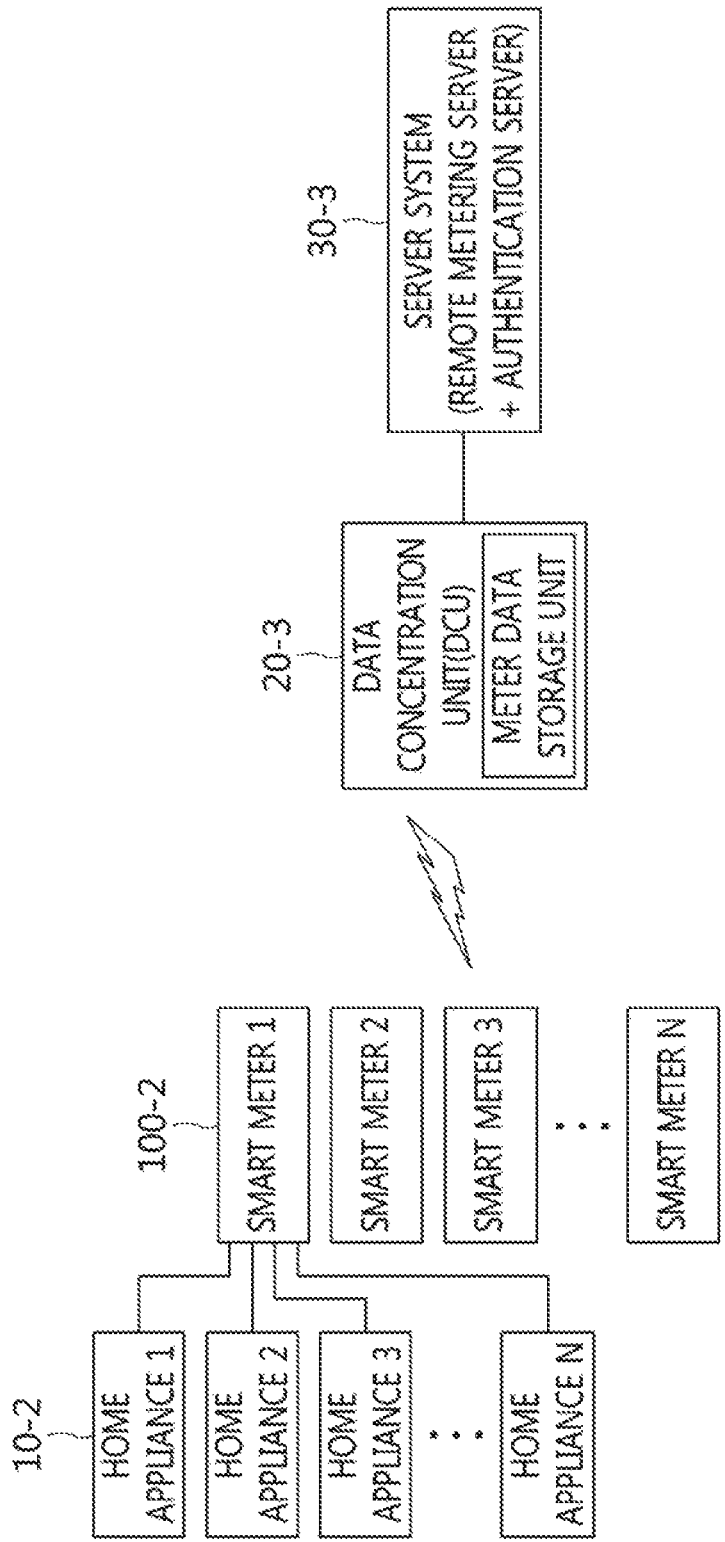
FIG. 3 is a view that shows a remote metering service using a smart meter, in which a data concentration unit stores meter data, according to an embodiment of the present invention.

FIG. 2 is a view that shows a remote metering service using a smart meter that stores meter data according to an embodiment of the present invention. FIG. 3 is a view that shows a remote metering service using a smart meter, in which a data concentration unit stores meter data, according to an embodiment of the present invention.

FIG. 2 and FIG. 3 show a remote metering service using a smart meter according to an embodiment of the present invention.

Smart meters 100-2 may read meter data, such as the amount of electricity consumed by home appliances 10-2.

Here, when the smart meters 100-2 include meter data storage, as illustrated in FIG. 2, the smart meters 100-2 may encrypt meter data before storing the meter data.

Here, the smart meters 100-2 may correspond to the IoT devices 100-1 for sensing data illustrated in FIG. 1.

A Data Concentration Unit (DCU) 20-2 may request the encrypted meter data, which are stored in the smart meters, and may transmit the received meter data to a server system 30-2.

Here, the DCU 20-2 may correspond to the gateway device 20-1 illustrated in FIG. 1, which may relay data between the smart meters 100-2 and the server system 30-2.

Here, the DCU 20-2 may include meter data storage, as illustrated in FIG. 3.

Here, the DCU 20-2 may receive and store meter data that are read and encrypted by the smart meters 100-2.

Here, the DCU 20-2 may transmit the stored meter data to the server system 30-2 when a request for meter data is made by the server system 30-2.

The server system 30-2 may include both a remote metering server device for providing a remote metering service and an authentication server device for authenticating an electricity supply service provider.

Here, the server system 30-2 may correspond to the IoT service provision server device 30-1 illustrated in FIG. 1.

Here, the server system 30-2 may decrypt the received encrypted meter data.

Here, the server system 30-2 may provide the decrypted meter data to the electricity supply service provider.

Figure 4:
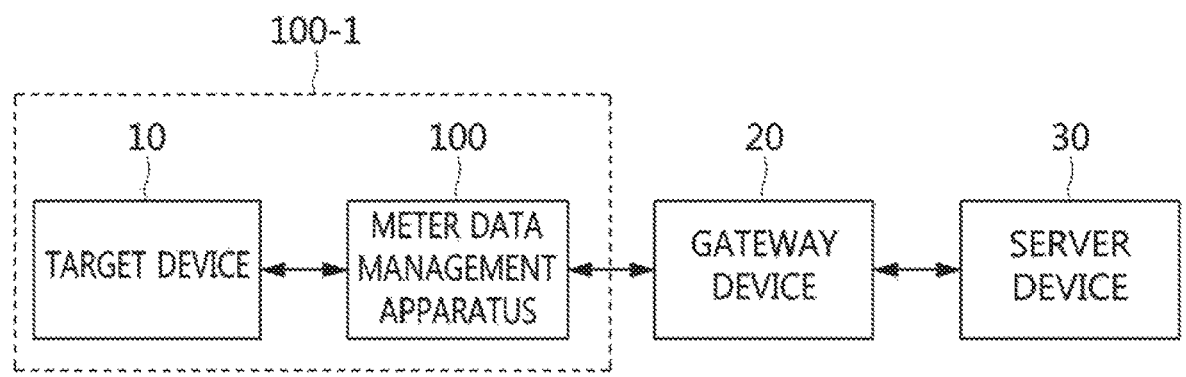
FIG. 4 is a block diagram that shows a metering management system according to an embodiment of the present invention.

FIG. 4 is a block diagram that shows a metering management system according to an embodiment of the present invention.

Referring to FIG. 4, a metering management system according to an embodiment of the present invention may include a target device 10, a gateway device 20, a server device 30, and a meter data management apparatus 100.

The target device 10 may correspond to the home appliance 10-2 or 10-3, of which the amount of electricity consumed thereby is to be measured, illustrated in FIG. 2 or FIG. 3.

The meter data management apparatus 100 may correspond to the smart meter 100-2 or 100-3 for reading information about the amount of electricity consumed by the home appliances illustrated in FIG. 2 or FIG. 3.

Also, in the IoT environment, the IoT device 100-1 may sense its data (i.e., measure the amount of electricity consumed by itself) and transmit the data to the server device, as illustrated in FIG. 1. Accordingly, the IoT device 100-1 may include both the target device 10 and the meter data management apparatus 100 therein.

Here, the meter data management apparatus 100 may acquire meter data by reading information about the amount of electricity consumed by the target device.

Also, in the IoT environment illustrated in FIG. 1, the meter data management apparatus 100 shown in FIG. 4 may not be separate from the IoT device 100-1, in which case the IoT device 100-1 may correspond to the target device 10 that is formed in such a way that the home appliance 10-2 or 10-3 shown in FIG. 2 or FIG. 3 includes the meter data management apparatus 100.

Here, the target device 10 may acquire meter data by autonomously reading information about the amount of electricity consumed by itself, encrypt the meter data, and store and transmit the encrypted meter data.

The gateway device 20 may relay data between the meter data management apparatus 100 and the server device 30.

Here, the gateway device 20 may correspond to the gateway device 20-1 in the IoT environment illustrated in FIG. 1 or the DCU 20-2 in the remote metering service illustrated in FIG. 2 or FIG. 3.

The server device 30 may request meter data from the meter data management apparatus 100 and may receive encrypted meter data and decrypt the same.

Here, the server device 30 may provide a remote metering service to users using the decrypted meter data.

Also, the meter data management apparatus 100 may register itself in the server device 30.

Here, the meter data management apparatus 100 may transmit a registration request message that includes the identifier thereof to the server device 30.

Here, using the identifier of the meter data management apparatus 100, which is included in the registration request message, the server device 30 may create an initial private key that is the same as the initial private key possessed by the meter data management apparatus 100.

Here, the server device 30 may transmit a registration completion message, in which time information including metering configurations is encrypted using the initial private key, to the meter data management apparatus 100.

Also, the meter data management apparatus 100 may acquire meter data by reading information about the amount of electricity consumed by the target device 10 depending on the metering configurations of the server device 30.

That is, the meter data management apparatus 100 may decrypt the registration completion message, received from the server device 30, using the initial private key.

Here, the meter data management apparatus 100 may acquire the time information including metering configurations by decrypting the registration completion message.

Here, the meter data management apparatus 100 may read information about the amount of electricity consumed by the target device 10 using a metering period and a metering start time included in the time information.

Here, the meter data management apparatus 100 may read information about the amount of electricity consumed by the target device 10 at time intervals of the metering period from the metering start time.

Also, the meter data management apparatus 100 may create a private key using the time information.

Here, the meter data management apparatus 100 may create a private key by taking the metering period and the metering start time as input.

Here, the meter data management apparatus 100 may encrypt the meter data using the private key and store the encrypted meter data.

Here, if the meter data management apparatus 100 includes storage for storing meter data, the meter data are stored therein. However, if the meter data management apparatus 100 does not include storage and the gateway device 20 includes storage, the meter data management apparatus 100 may transmit the encrypted meter data to the gateway device 20 so that the gateway device 20 may store the encrypted meter data therein.

Similarly, the server device 30 may create a private key that is the same as the private key created by the meter data management apparatus 100 by taking the metering period and the metering start time as input.

Here, the server device 30 may create a meter data request message in which time information including new metering configurations is encrypted using the private key, and may transmit the meter data request message to the meter data management apparatus 100.

Here, the meter data management apparatus 100 may decrypt the meter data request message using the private key, thereby acquiring a metering period and a metering request time.

Here, when the metering period is determined to be changed as the result of comparison of the previous metering period with the newly acquired metering period, the meter data management apparatus 100 may select the newly acquired metering period.

Here, the meter data management apparatus 100 may transmit meter data, in which meter data from the metering start time to the metering request time are encrypted and saved, to the server device 30.

Here, if the meter data are stored in the gateway device 20, the meter data management apparatus 100 may approve transmission of the meter data by the gateway device 20.

The server device 30 may decrypt the received meter data using the private key, and may provide users with a metering service using the decrypted meter data.

Also, the meter data management apparatus 100 may create a new private key by taking the new metering period and the metering request time as input, and may encrypt meter data using the new private key and store the encrypted meter data.

The server device 30 may repeatedly create a new private key by taking a new metering period and a metering request time as input, and may repeatedly create a meter data request message using the new private key, thereby requesting meter data.

As described above, the meter data management apparatus 100 and the server device 30 repeatedly create new private keys by taking a new metering period and a new metering request time as input, encrypt meter data using the private key and store the encrypted meter data, and provide service by decrypting the meter data using the private key, thereby maximizing the security of meter data acquired from the target device 10.

Also, in the IoT environment and the remote metering service illustrated in FIGS. 1 to 3, data acquired by sensing the IoT devices 100-1 and meter data acquired by the smart meters 100-2 or 100-3 may be effectively and securely managed through the above-described method.

Hereinafter, the components of each of the devices included in the metering management system illustrated in FIG. 4 will be described in detail.

Figure 5:
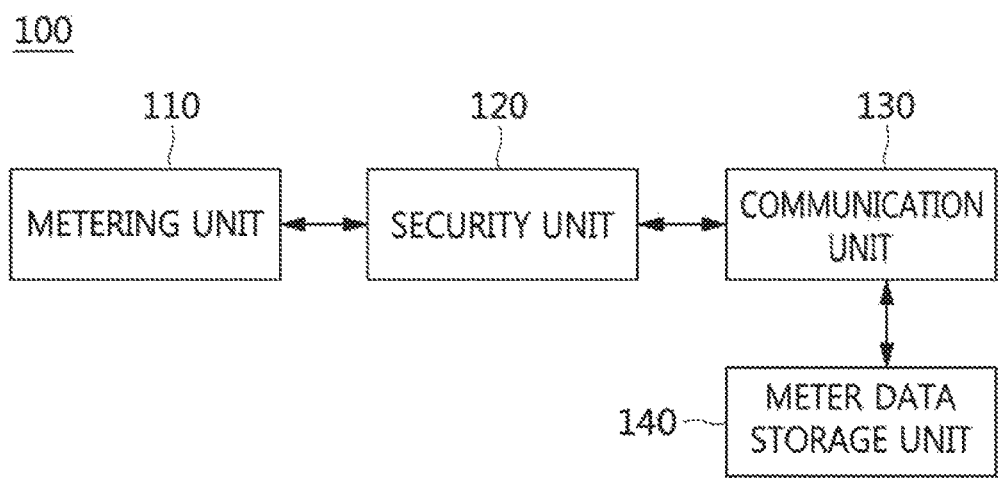
FIG. 5 is a block diagram that specifically shows an example of the meter data management apparatus illustrated in FIG. 4.

FIG. 5 is a block diagram that specifically shows an example of the meter data management apparatus illustrated in FIG. 4.

Referring to FIG. 5, a meter data management apparatus 100 according to an embodiment of the present invention includes a metering unit 110, a security unit 120 and a communication unit 130. Here, the meter data management apparatus 100 may further include a meter data storage unit 140.

The metering unit 110 acquires meter data from a target device 10 based on time information.

The time information may include metering configuration information set by a server device 30.

That is, the time information may include at least one of a metering period, a metering start time, and a metering request time.

The meter data may be the amount of electricity consumed by the target device 10.

For example, the metering period may be set in units of minutes to, for example, one minute, five minutes, ten minutes, fifteen minutes, thirty minutes, sixty minutes, or the like.

Here, when it receives the metering period and the metering start time, the metering unit 110 may read the meter data of the target device 10 at time intervals of the metering period from the metering start time.

Here, when it receives a new metering period, the metering unit 110 may change the metering period and read the meter data of the target device 10 based on the changed metering period.

Here, when the meter data management apparatus 100 is connected with multiple target devices 10, the metering unit 110 may set the metering period and the metering start time to different values for the respective target devices 10.

Here, the metering unit 110 may read meter data based on the metering period and the metering start time, which are different for the respective target devices 10.

The security unit 120 may create a private key using time information, and may encrypt meter data using the private key.

First, the security unit 120 may create a registration request message for registering the meter data management apparatus 100 in the server device 30.

Here, the security unit 120 may create a registration request message that includes the address of a destination, the address of an origin, and the identifier (ID) of the meter data management apparatus 100, which is the unique information thereof.

Here, information about the amount of memory for storing meter data in the meter data management apparatus 100 may be further included in the registration request message.

The information about the amount of memory may be used as a reference when the server device 30 sets a metering period to be included in a registration completion message or a meter data request message.

Here, the security unit 120 may contain an initial private key to be used for the registration process.

Also, the security unit 120 may decrypt a registration completion message, received from the server device 30, using the initial private key.

Here, the security unit 120 may acquire first time information by decrypting the registration completion message.

Here, the security unit 120 may deliver a metering period and a metering start time included in the first time information, which is acquired by decrypting the registration completion message, to the metering unit 110.

Here, the security unit 120 may create a first private key by taking the metering period and the metering start time, included in the first time information, as input, the first time information being acquired by decrypting the registration completion message.

Here, the security unit 120 may encrypt meter data, acquired by the metering unit 110 from the metering start time, using the first private key, and may transmit the encrypted meter data to the meter data storage unit 140 or the gateway device 20 for storing meter data.

Also, the security unit 120 may decrypt a first meter data request message, received from the server device 30, using the first private key.

Here, the security unit 120 may acquire second time information by decrypting the first meter data request message.

Here, the security unit 120 may deliver a metering period and a first metering request time included in the second time information, which is acquired by decrypting the first meter data request message, to the meter data storage unit 140 or the gateway device 20.

Also, the security unit 120 may select the metering period of the second time information when the metering period is determined to be changed as the result of comparison of the metering period of the first time information with that of the second time information.

Here, when it sets a new metering period, the security unit 120 may deliver the new metering period to the metering unit 110, and the metering unit 110 may acquire meter data based on the new metering period.

Also, the security unit 120 may create a second private key by taking the metering period and the first metering request time, included in the second time information, as input, the second time information being acquired by decrypting the first meter data request message.

Here, the security unit 120 may create a second private key using the second time information, and may encrypt meter data, acquired after the first meter data request message is received, using the second private key.

Here, the security unit 120 may encrypt meter data, acquired by the metering unit 110, using the second private key, and may deliver the encrypted meter data to the meter data storage unit 140 or the gateway device 20 for storing meter data.

Also, the security unit 120 may decrypt a second meter data request message, received from the server device 30, using the second private key.

Here, the security unit 120 may acquire third time information by decrypting the second meter data request message.

Here, the security unit 120 may deliver a metering period and a second metering request time included in the third time information, which is acquired by decrypting the second meter data request message, to the meter data storage unit 140 or the gateway device 20.

Also, the security unit 120 may select the metering period of the third time information when the metering period is determined to be changed as the result of comparison of the metering period of the second time information with that of the third time information.

Here, when it selects a new metering period, the security unit 120 may deliver the new metering period to the metering unit 110, and the metering unit 110 may acquire meter data based on the new metering period.

Also, the security unit 120 may create a third private key by taking the metering period and the second metering request time, included in the third time information, as input, the third time information being acquired by decrypting the second meter data request message.

Here, the security unit 120 may create a third private key using the third time information, and may encrypt meter data, acquired after the second meter data request message is received, using the third private key.

Here, the security unit 120 may encrypt the meter data, acquired by the metering unit 110, using the third private key, and may deliver the encrypted meter data to the meter data storage unit 140 or the gateway device 20 for storing meter data.

As described above, the security unit 120 may create a new private key whenever it receives a new meter data request message from the server device 30.

Here, the security unit 120 may create a new private key using a new meter data request message, encrypt meter data, acquired after the meter data request message is received, using the new private key, and store the encrypted meter data.

Also, the security unit 120 may use an operation mode that includes confidentiality and message authentication through a lightweight symmetric key cryptography algorithm.

For example, the security unit 120 may provide only confidentiality, or both confidentiality and integrity depending on the resources of a smart meter in the lowest layer or on the data transmission speed thereof.

Accordingly, the encrypted meter data stored in the meter data storage unit 140 or the gateway device 20 may include the identifier of the meter data management apparatus 100, the date and time at which meter data are read, and information about electricity consumption.

For example, the encrypted meter data may be configured in the form of "Enc[smart meter ID (SM_ID)||the date and time at which meter data are read (YYMMDD-HHMM) ||electricity consumption]", and the integrity value may be further included therein.

The communication unit 130 may receive a message that includes time information from the server device 30, and may transmit meter data to the server device 30.

Here, the communication unit 130 may communicate with the server device 30 via the gateway device 20.

Here, the communication unit 130 may transmit the registration request message created by the security unit 120 to the gateway device 20 or the server device 30.

Here, the communication unit 130 may transmit the meter data stored in the meter data storage unit 140 to the gateway device 20 or the server device 30 in response to a request by the security unit 120.

Here, the communication unit 130 may transmit a message for approving the transmission of meter data to the gateway device 20 in response to a request by the security unit 120.

Here, the communication unit 130 may receive a registration completion message or a meter data request message from the gateway device 20 or the server device 30.

The meter data storage unit 140 may store meter data encrypted by the security unit 120.

Here, the meter data management apparatus 100 may not include the meter data storage unit 140 when the meter data management apparatus 100 is a low-specification device having no storage.

Here, the meter data storage unit 140 may transmit meter data, in which meter data from the metering start time to the metering request time are encrypted and saved, to the communication unit 130 in response to a request by the security unit 120.

Here, the meter data storage unit 140 may transmit meter data, in which meter data from the first metering request time to the second metering request time are encrypted and saved, to the communication unit 130 in response to a request by the security unit 120.

Figure 6:
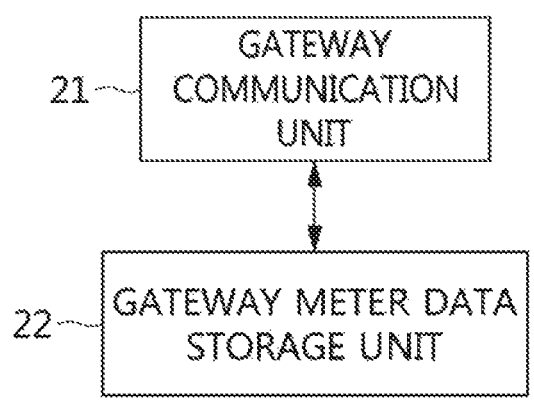
FIG. 6 is a block diagram that specifically shows an example of the gateway device illustrated in FIG. 4.

FIG. 6 is a block diagram that specifically shows an example of the gateway device illustrated in FIG. 4.

Referring to FIG. 6, the gateway device 20 according to an embodiment of the present invention may include a gateway communication unit 21 and a gateway meter data storage unit 22.

The gateway communication unit 21 may relay communication between the meter data management apparatus 100 and the server device 30.

The gateway communication unit 21 may receive a message that includes time information from the server device 30, and may transmit meter data to the server device 30.

Here, the gateway communication unit 21 may transmit the registration request message, transmitted from the meter data management apparatus 100, to the server device 30.

Here, the gateway communication unit 21 may transmit meter data stored in the gateway meter data storage unit 22 to the server device 30 in response to a request by the meter data management apparatus 100.

Here, the gateway communication unit 21 may receive a message for approving the transmission of meter data from the meter data management apparatus 100.

Here, the gateway communication unit 21 may receive a registration completion message or a meter data request message from the server device 30.

The gateway meter data storage unit 22 may store the meter data received from the meter data management apparatus 100.

Here, the gateway meter data storage unit 22 may transmit meter data, in which meter data from the metering start time to the metering request time are encrypted and saved, to the gateway communication unit 21 in response to a request by the meter data management apparatus 100.

Here, the gateway meter data storage unit 22 may transmit meter data, in which meter data from the first metering request time to the second metering request time are encrypted and saved, to the gateway communication unit 21 in response to a request by the meter data management apparatus 100.

Figure 7:
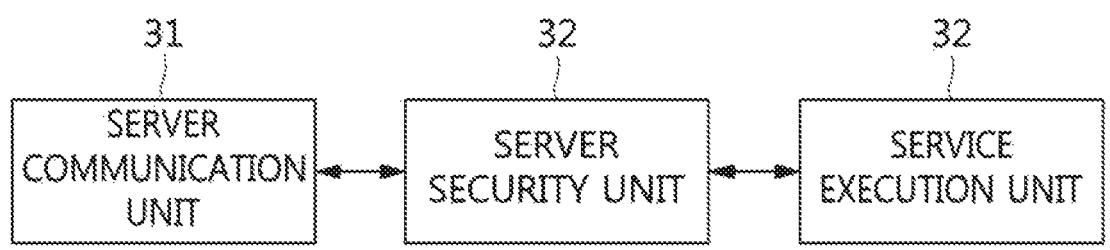
FIG. 7 is a block diagram that specifically shows an example of the server device illustrated in FIG. 4.

FIG. 7 is a block diagram that specifically shows an example of the server device illustrated in FIG. 4.

Referring to FIG. 7, the server device 30 according to an embodiment of the present invention may include a server communication unit 31, a server security unit 32, and a service execution unit 33.

The server communication unit 31 may receive a registration request message and deliver the same to the server security unit 32.

The server security unit 32 may acquire the identifier of the meter data management apparatus 100 included in the registration request message.

Here, the server security unit 32 may create an initial private key using the identifier of the meter data management apparatus 100, included in the registration request message, and secret information about the server device 30.

Here, the server security unit 32 may register the meter data management apparatus 100 by checking the identifier of the meter data management apparatus 100, which is included in the registration request message.

Here, the server security unit 32 may contain the secret information of the server device 30 therein.

Here, the initial private key created by the server device 30 may match the initial private key created by the security unit 120 of the meter data management apparatus 100.

Accordingly, without the need to manage secret information of multiple meter data management apparatuses 100, the server device 30 may create a private key that matches the initial private key contained in each of the meter data management apparatuses 100 using the secret information of the server device 30 and the identifier of each of the meter data management apparatuses 100 received therefrom.

Also, the server security unit 32 may create a registration completion message in which first time information is encrypted using the initial private key.

Here, the server security unit 32 may create a registration completion message in which a metering period and a metering start time included in the first time information are encrypted using the initial private key.

Here, the metering period may be set depending on the characteristics of a service or information about the amount of memory for storing meter data in the meter data management apparatus 100 or the gateway device 20, which is included in the registration request message.

Here, the server security unit 32 may set the metering period to be inversely proportional to the amount of memory for storing meter data in the meter data management apparatus 100 or the gateway device 20.

For example, the server security unit 32 may set the metering period to be shorter as the amount of memory in the meter data management apparatus 100 or the gateway device 20 is larger, and conversely may set the metering period to be longer as the amount of memory is smaller.

Also, the server security unit 32 may set the metering period to be inversely proportional to a change in the amount of electricity consumed by the target device 10 depending on the service characteristics.

For example, the server security unit 32 may set the metering period to be shorter as the change in the amount of electricity consumed by the target device 10 is larger, but may set the metering period to be longer as the change in the amount of electricity consumed by the target device 10 is smaller.

For example, the metering period may be set in units of minutes to, for example, one minute, five minutes, ten minutes, fifteen minutes, thirty minutes, sixty minutes, or the like.

Here, the server communication unit 31 may transmit the created registration completion message to the meter data management apparatus 100.

Also, the server security unit 32 may create a first private key by taking the metering period and the metering start time, included in the first time information, as input.

Here, the server security unit 32 may create a first meter data request message in which second time information is encrypted using the first private key.

Also, the server security unit 32 may create a first meter data request message in which the metering period and the first metering request time included in the second time information are encrypted using the first private key.

Here, the server security unit 32 may set the metering period of the second time information to be the same as that of the first time information, or may change the metering period.

That is, the server security unit 32 may set the metering period by changing the previous metering period depending on the characteristics of the metering service to be provided or on information about the amount of memory for storing meter data in the meter data management apparatus 100, which is included in the registration request message.

Here, the server security unit 32 may set the metering period to be inversely proportional to the amount of memory for storing meter data in the meter data management apparatus 100 or the gateway device 20.

For example, the server security unit 32 may set the metering period to be shorter as the amount of memory in the meter data management apparatus 100 or the gateway device 20 is larger, but may set the metering period to be longer as the amount of memory is smaller.

Also, the server security unit 32 may set the metering period to be inversely proportional to a change in the amount of electricity consumed by the target device 10 depending on the service characteristics.

For example, the server security unit 32 may set the metering period to be shorter as the change in the amount of electricity consumed by the target device 10 is larger, but may set the metering period to be longer as the change in the amount of electricity consumed by the target device 10 is smaller.

For example, the metering period may be set in units of minutes to, for example, one minute, five minutes, ten minutes, fifteen minutes, thirty minutes, sixty minutes, or the like.

Here, the server security unit 32 may transmit the created first meter data request message to the meter data management apparatus 100.

Here, the server security unit 32 may decrypt the encrypted first meter data, received from the meter data management apparatus 100, using the first private key.

Here, the first meter data may be meter data read from the metering start time to the first metering request time.

Here, because the first meter data are encrypted by the meter data management apparatus 100 using the first private key, which is created by taking the metering period and the metering start time as input, the server security unit 32 may decrypt the encrypted first meter data using the first private key.

Here, the server security unit 32 may deliver the decrypted first meter data to the service execution unit 33.

Here, the service execution unit 33 may provide users with a metering service using the decrypted first meter data.

Also, the server security unit 32 may create a second private key by taking the metering period and the first metering request time, included in the second time information, as input.

Here, the server security unit 32 may create a second meter data request message in which third time information is encrypted using the second private key.

Here, the server security unit 32 may create a second meter data request message in which the metering period and the second metering request time included in the third time information are encrypted using the second private key.

Here, the server security unit 32 may transmit the created second meter data request message to the meter data management apparatus 100.

Also, the server security unit 32 may decrypt the encrypted second meter data, received from the meter data management apparatus 100, using the second private key.

Here, the second meter data may be meter data read from the first metering request time to the second metering request time.

Here, because the second meter data are encrypted by the meter data management apparatus 100 using the second private key, which is created by taking the metering period and the second metering request time as input, the server security unit 32 may decrypt the encrypted second meter data using the second private key.

Here, the server security unit 32 may deliver the decrypted second meter data to the service execution unit 33.

Here, the service execution unit 33 may provide users with a metering service using the decrypted second meter data.

As described above, the server security unit 32 may create a new private key whenever it transmits a new meter data request message to the meter data management apparatus 100.

Here, the server security unit 32 may transmit a new meter data request message, in which new time information for new metering configurations is encrypted using a new private key, to the meter data management apparatus 100.

Also, the server security unit 32 may use an operation mode that includes confidentiality and message authentication through a lightweight symmetric key cryptography algorithm.

For example, the server security unit 32 may provide only confidentiality or both confidentiality and integrity depending on the resources of a smart meter in the lowest layer or on the data transmission speed thereof.

Accordingly, the encrypted meter data stored in the meter data management apparatus 100 or the gateway device 20 may include the identifier of the meter data management apparatus 100, the date and time at which meter data are read, and information about electricity consumption.

For example, meter data may be configured in the form of "Enc[smart meter ID (SM_ID)||the date and time at which meter data are read (YYMMDD-HHMM)||electricity consumption]" and may further include an integrity value.

Figure 8:
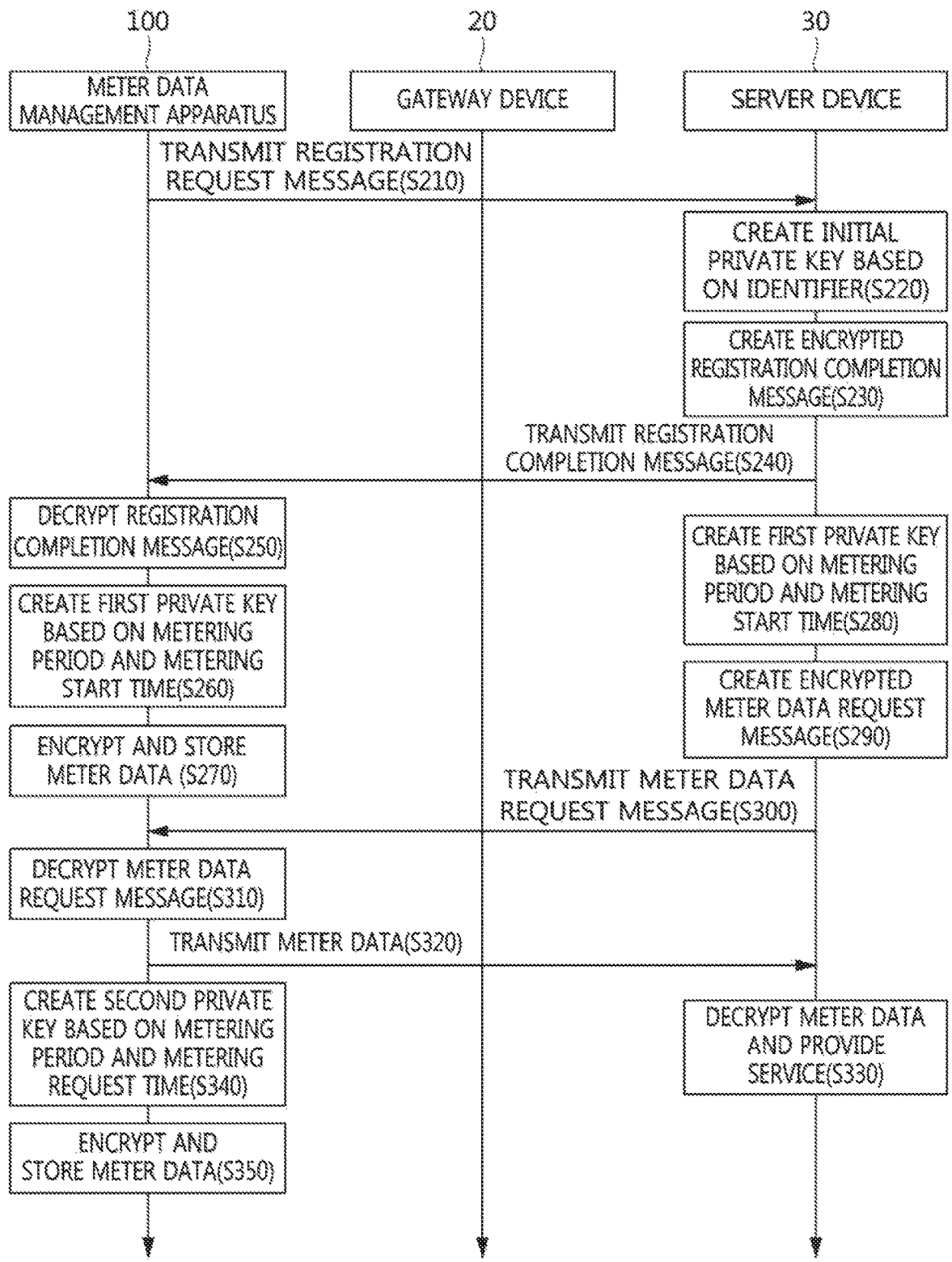
FIG. 8 and FIG. 9 are sequence diagrams that show a meter data management method in which a meter data management apparatus stores meter data according to an embodiment of the present invention.
Figure 9:
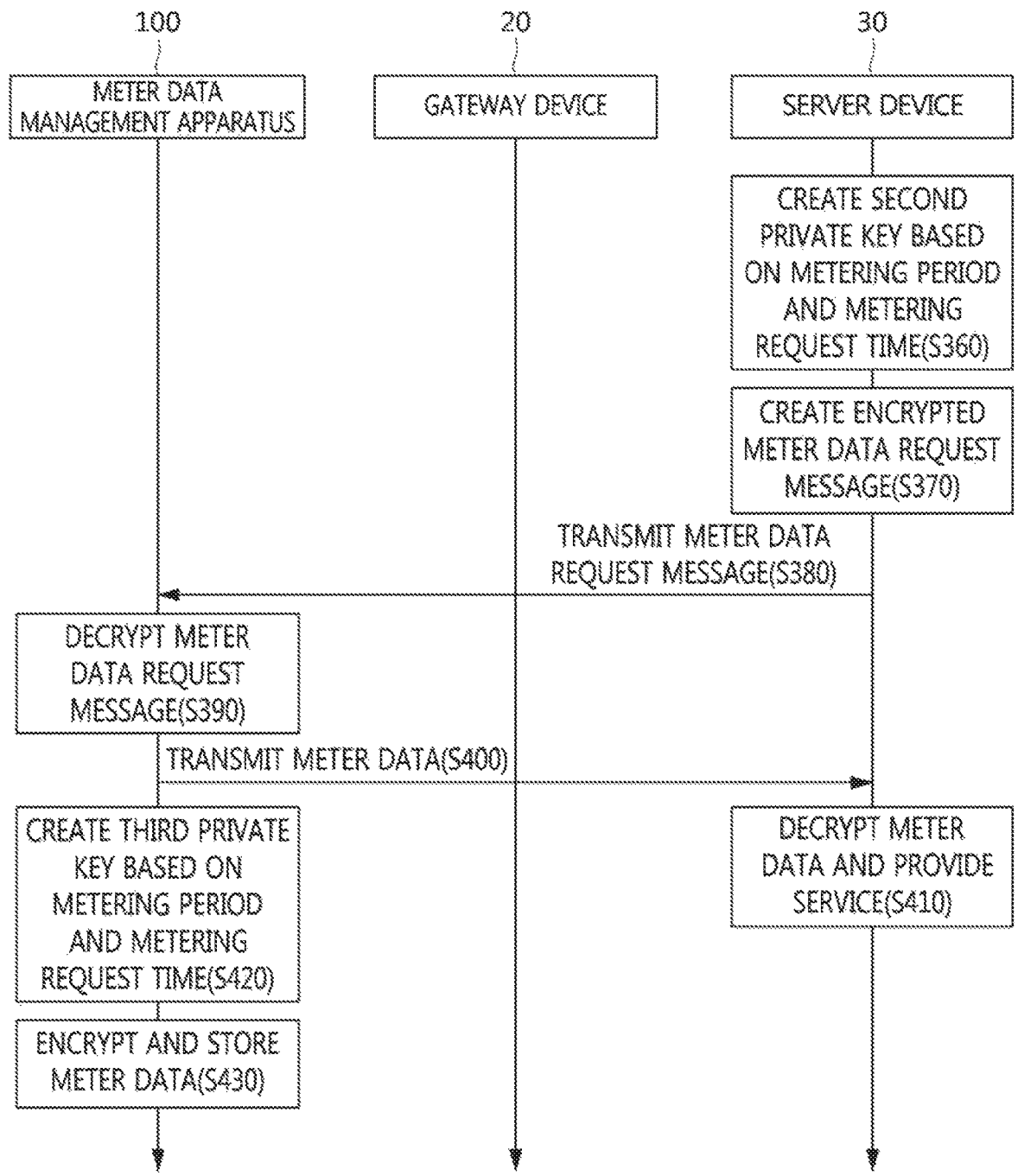

FIG. 8 and FIG. 9 are sequence diagrams that show a meter data management method in which a meter data management apparatus stores meter data according to an embodiment of the present invention.

Referring to FIG. 8, in the meter data management method according to an embodiment of the present invention, first, a registration request message may be transmitted at step S210.

Here, the meter data management apparatus 100 may transmit a registration request message to the server device 30 at step S210.

Here, the meter data management apparatus 100 may create a registration request message for registering itself in the server device 30 at step S210.

Here, at step S210, the meter data management apparatus 100 may create a registration request message that includes the address of a destination, the address of an origin, and the identifier of the meter data management apparatus 100, which is the unique information thereof.

Here, the registration request message may further include information about the amount of memory for storing meter data in the meter data management apparatus 100.

The information about the amount of memory may be used as a reference when the server device 30 sets a metering period to be included in a registration completion message or a meter data request message.

Also, in the meter data management method according to an embodiment of the present invention, an initial private key may be created at step S220.

That is, at step S220, the server device 30 may create an initial private key using the identifier of the meter data management apparatus 100, which is acquired from the registration request message.

Here, the server device 30 may acquire the identifier of the meter data management apparatus 100 at step S220 by receiving the registration request message.

Here, the server device 30 may create an initial private key using the secret information thereof and the identifier of the meter data management apparatus 100, which is included in the registration request message, at step S220.

Here, the server device 30 registers the meter data management apparatus 100 at step S220 by checking the identifier of the meter data management apparatus 100 included in the registration request message.

Here, the initial private key created by the server device 30 may match the initial private key created by the security unit 120 of the meter data management apparatus 100.

Accordingly, without the need to manage secret information of multiple meter data management apparatuses 100, the server device 30 may create a private key that matches the initial private key contained in each of the meter data management apparatuses 100 using the secret information of the server device 30 and the identifier of each of the meter data management apparatuses 100 received therefrom at step S220.

Also, in the meter data management method according to an embodiment of the present invention, an encrypted registration completion message may be created at step S230.

That is, at step S230, the server device 30 may create a registration completion message in which first time information is encrypted using the initial private key.

Here, at step S230, the server device 30 may create a registration completion message in which a metering period and a metering start time included in the first time information are encrypted using the initial private key.

Here, the metering period may be set depending on service characteristics or information about the amount of memory for storing meter data in the meter data management apparatus 100, which is included in the registration request message.

Here, at step S230, the metering period may be set to be inversely proportional to the amount of memory for storing meter data in the meter data management apparatus 100.

For example, at step S230, the larger the amount of memory in the meter data management apparatus 100, the shorter the metering period may be set. Conversely, the smaller the amount of memory in the meter data management apparatus 100, the longer the metering period may be set.

Also, at step S230, the metering period may be set to be inversely proportional to a change in the amount of electricity consumed by the target device 10 depending on the service characteristics.

For example, at step S230, the larger the change in the amount of electricity consumed by the target device 10, the shorter the metering period may be set. Conversely, the smaller the change in the amount of electricity consumed by the target device 10, the longer the metering period may be set.

For example, the metering period may be set in units of minutes to, for example, one minute, five minutes, ten minutes, fifteen minutes, thirty minutes, sixty minutes, or the like.

Also, in the meter data management method according to an embodiment of the present invention, the encrypted registration completion message may be transmitted at step S240.

That is, the server device 30 may transmit the created registration completion message to the meter data management apparatus 100 at step S240.

Also, in the meter data management method according to an embodiment of the present invention, the registration completion message may be decrypted at step S250.

That is, the meter data management apparatus 100 may decrypt the registration completion message, received from the server device 30, using the initial private key at step S250.

Here, the meter data management apparatus 100 may acquire the first time information at step S250 by decrypting the registration completion message.

Here, at step S250, the meter data management apparatus 100 may acquire meter data from the target device using the metering period and the metering start time of the first time information, which is acquired by decrypting the registration completion message.

Also, in the meter data management method according to an embodiment of the present invention, the meter data management apparatus 100 may create a first private key at step S260.

That is, at step S260, the meter data management apparatus 100 may create a first private key by taking the metering period and the metering start time, included in the first time information, as input, the first time information being acquired by decrypting the registration completion message.

Also, in the meter data management method according to an embodiment of the present invention, meter data may be encrypted and stored at step S270.

That is, at step S270, the meter data management apparatus 100 may encrypt meter data, which are read at time intervals of the metering period of the first time information from the metering start time, using the first private key, and may store the encrypted meter data.

Also, in the meter data management method according to an embodiment of the present invention, the server device 30 may create a first private key at step S280.

Here, at step S280, the server device 30 may create a first private key by taking the metering period and the metering start time, included in the first time information, as input, the first time information being acquired by decrypting the registration completion message.

Here, step S280 may be performed before step S250.

Also, in the meter data management method according to an embodiment of the present invention, an encrypted meter data request message may be created at step S290.

That is, at step S290, the server device 30 may create a first meter data request message in which second time information is encrypted using the first private key.

Here, at step S290, the server device 30 may create a first meter data request message in which the metering period and a first metering request time included in the second time information are encrypted using the first private key.

Here, at step S290, the server device 30 may set the metering period of the second time information to be the same as the metering period of the first time information, which is set at step S230, or may change the metering period.

That is, the metering period may be set by changing the previous metering period depending on the characteristics of the metering service to be provided or information about the amount of memory for storing the meter data in the meter data management apparatus 100, which is included in the registration request message.

Here, at step S290, the metering period may be set to be inversely proportional to the amount of memory for storing the meter data in the meter data management apparatus 100.

For example, at step S290, the larger the amount of memory in the meter data management apparatus 100, the shorter the metering period may be set. Conversely, the smaller the amount of memory in the meter data management apparatus 100, the longer the metering period may be set.

Also, at step S290, the metering period may be set to be inversely proportional to a change in the amount of electricity consumed by the target device 10 depending on the service characteristics.

For example, at step S290, the larger the change in the amount of electricity consumed by the target device 10, the shorter the metering period may be set. Conversely, the smaller the change in the amount of electricity consumed by the target device 10, the longer the metering period may be set.

For example, the metering period may be set in units of minutes to, for example, one minute, five minutes, ten minutes, fifteen minutes, thirty minutes, sixty minutes, or the like.

Also, in the meter data management method according to an embodiment of the present invention, the meter data request message may be transmitted at step S300.

That is, the server device 30 may transmit the created first meter data request message to the meter data management apparatus 100 at step S300.

Also, in the meter data management method according to an embodiment of the present invention, the meter data request message may be decrypted at step S310.

That is, the meter data management apparatus 100 may decrypt the first meter data request message, received from the server device 30, using the first private key at step S310.

Here, the meter data management apparatus 100 may acquire the second time information at step S310 by decrypting the first meter data request message.

Here, at step S310, the meter data management apparatus 100 may acquire the metering period and the first metering request time included in the second time information by decrypting the first meter data request message.

Here, at step S310, when the metering period is determined to be changed as the result of comparison of the metering period of the first time information with that of the second time information, the metering period of the second time information may be selected.

Here, at step S310, when the new metering period is set, the meter data management apparatus 100 may acquire meter data based on the new metering period.

Also, in the meter data management method according to an embodiment of the present invention, the meter data may be transmitted at step S320.

That is, at step S320, the meter data management apparatus 100 may transmit the first meter data, in which meter data from the metering start time of the first time information to the first metering request time of the second time information are encrypted and saved, to the server device 30.

Also, in the meter data management method according to an embodiment of the present invention, the first meter data may be decrypted at step S330.

That is, at step S330, the server device 30 may decrypt the encrypted first meter data, received from the meter data management apparatus 100, using the first private key.

Here, the first meter data may be meter data read from the metering start time to the first metering request time.

Here, because the first meter data are encrypted by the meter data management apparatus 100 using the first private key, which is created by taking the metering period and the metering start time as input, the server device 30 may decrypt the encrypted first meter data using the first private key at step S330.

Here, the server device 30 may provide users with a metering service using the decrypted first meter data at step S330.

Also, in the meter data management method according to an embodiment of the present invention, the meter data management apparatus 100 may create a second private key at step S340.

That is, at step S340, the meter data management apparatus 100 may create a second private key by taking the metering period and the first metering request time, included in the second time information, as input, the second time information being acquired by decrypting the first meter data request message.

Here, step S340 may be performed before step S330.

Here, at step S340, the meter data management apparatus 100 may acquire meter data depending on a new metering period when the new metering period is selected. That is, when the metering period of the first time information differs from that of the second time information, meter data may be acquired based on the metering period of the second time information.

Also, in the meter data management method according to an embodiment of the present invention, the meter data may be encrypted and stored at step S350.

That is, at step S350, the meter data management apparatus 100 may encrypt meter data, which are read at time intervals of the metering period of the second time information from the first metering request time, using the second private key, and may store the encrypted meter data.

Referring to FIG. 9, in the meter data management method according to an embodiment of the present invention, the server device 30 may create a second private key at step S360.

That is, at step S360, the server device 30 may create a second private key by taking the metering period and the first metering request time, included in the second time information, as input.

Also, in the meter data management method according to an embodiment of the present invention, an encrypted meter data request message may be created at step S370.

That is, at step S370, the server device 30 may create a second meter data request message in which third time information is encrypted using the second private key.

Here, at step S370, the server device 30 may create a second meter data request message in which the metering period and the second metering request time included in the third time information are encrypted using the second private key.

Here, at step S370, the server device 30 may set the metering period of the third time information to be the same as that of the second time information, which is set at step S290, or may change the metering period.

That is, at step S370, the metering period may be changed depending on the characteristics of the metering service to be provided or information about the amount of memory for storing the meter data in the meter data management apparatus 100, which is included in the registration request message.

Here, at step S370, the metering period may be set to be inversely proportional to the amount of memory for storing meter data in the meter data management apparatus 100.

For example, at step S370, the larger the amount of memory in the meter data management apparatus 100, the shorter the metering period may be set. Conversely, the smaller the amount of memory in the meter data management apparatus 100, the longer the metering period may be set.

Also, at step S370, the metering period may be set to be inversely proportional to a change in the amount of electricity consumed by the target device 10 depending on the service characteristics.

For example, at step S370, the larger the change in the amount of electricity consumed by the target device 10, the shorter the metering period may be set. Conversely, the smaller the change in the amount of electricity consumed by the target device 10, the longer the metering period may be set.

For example, the metering period may be set in units of minutes to, for example, one minute, five minutes, ten minutes, fifteen minutes, thirty minutes, sixty minutes, or the like.

Also, in the meter data management method according to an embodiment of the present invention, the meter data request message may be transmitted at step S380.

That is, the server device 30 may transmit the created second meter data request message to the meter data management apparatus 100 at step S380.

Also, in the meter data management method according to an embodiment of the present invention, the meter data request message may be decrypted at step S390.

That is, the meter data management apparatus 100 may decrypt the second meter data request message, received form the server device 30, using the second private key at step S390.

Here, the meter data management apparatus 100 may acquire the third time information at step S390 by decrypting the second meter data request message.

Here, at step S390, the meter data management apparatus 100 may acquire the metering period and the second metering request time included in the third time information by decrypting the second meter data request message.

Here, at step S390, when the metering period is determined to be changed as the result of comparison of the metering period of the second time information with that of the third time information, the metering period of the third time information may be selected.

Here, at step S390, when the new metering period is selected, the meter data management apparatus 100 may acquire meter data based on the new metering period.

Also, in the meter data management method according to an embodiment of the present invention, the meter data may be transmitted at step S400.

That is, at step S400, the meter data management apparatus 100 may transmit second meter data, in which meter data from the first metering request time of the second time information to the second metering request time of the third time information are saved, to the server device 30.

Also, in the meter data management method according to an embodiment of the present invention, the meter data may be decrypted at step S410.

That is, the server device 30 may decrypt the encrypted second meter data, received from the meter data management apparatus 100, using the second private key at step S410.

Here, the second meter data may be meter data read from the first metering request time to the second metering request time.

Here, because the second meter data are encrypted by the meter data management apparatus 100 using the second private key, which is created by taking the metering period and the second metering request time as input, the server device 30 may decrypt the encrypted second meter data using the second private key at step S410.

Here, the server device 30 may provide users with a metering service using the decrypted second meter data at step S410.

Also, in the meter data management method according to an embodiment of the present invention, a third private key may be created at step S420.

That is, at step S420, the meter data management apparatus 100 may create a third private key by taking the metering period and the second metering request time, included in the third time information, as input, the third time information being acquired by decrypting the second meter data request message.

Here, step S420 may be performed before step S410.

Here, at step 420, the meter data management apparatus 100 may acquire meter data based on a new metering period when the new metering period is selected. That is, when the metering period of the second time information is determined to differ from that of the third time information, meter data may be acquired based on the metering period of the third time information.

Also, in the meter data management method according to an embodiment of the present invention, the meter data may be encrypted at step S430.

That is, at step S430, the meter data management apparatus 100 may encrypt meter data, which are read at time intervals of the metering period of the third time information from the second metering request time, using the third private key, and may store the encrypted meter data.

In the meter data management method, when the meter data management apparatus 100 and the server device 30 respectively create new private keys at the same time, the new private keys may be the same as each other.

Also, in the meter data management method, the meter data management apparatus 100 and the server device 30 may use an operation mode that includes confidentiality and message authentication using a lightweight symmetric key cryptography algorithm.

For example, in the meter data management method, the meter data management apparatus 100 and the server device 30 may provide only confidentiality or both confidentiality and integrity depending on the resources of the smart meter in the lowest layer or on the data transmission speed thereof.

Accordingly, in the meter data management method, encrypted meter data stored in the meter data management apparatus 100 or the gateway device 20 may include the identifier of the meter data management apparatus 100, the date and time at which meter data are read, and information about electricity consumption.

For example, meter data may be configured in the form of "Enc[smart meter ID (SM_ID)||the date and time at which meter data are read (YYMMDD-HHMM)||electricity consumption]", and may further include an integrity value.

Also, in the meter data management method, the server device 30 may create a new private key whenever it transmits a new meter data request message to the meter data management apparatus 100, and the meter data management apparatus 100 may create a new private key whenever it receives the new meter data request message through the above-described steps S360 to S430.

That is, in the meter data management method according to an embodiment of the present invention, steps S360 to S430 may be repeatedly performed, whereby meter data may be securely protected using a private key, which is newly created in response to a request by the server device 30, and meter data may be optimally acquired using a changed metering period.

Figure 10:
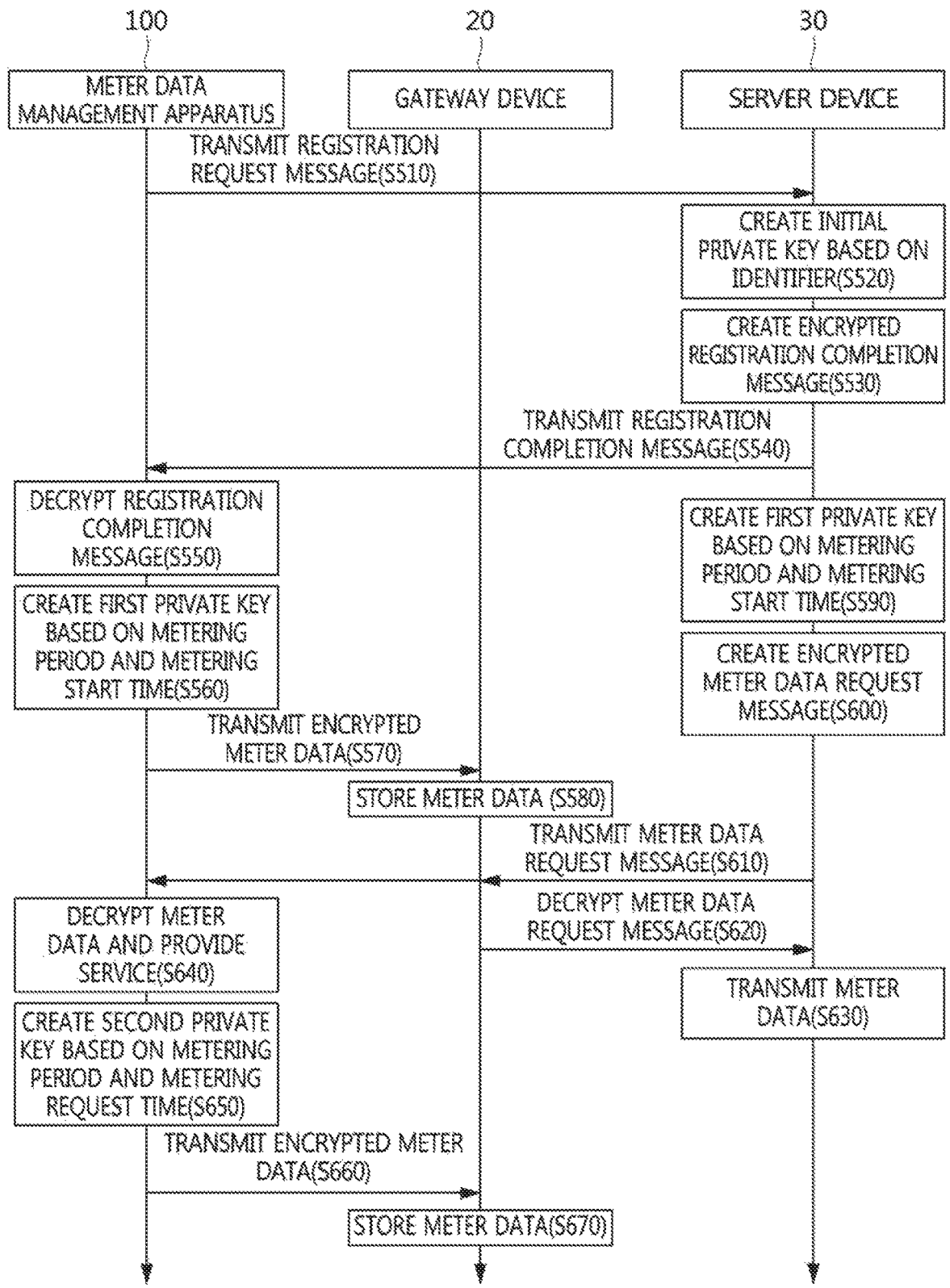
FIG. 10 and FIG. 11 are sequence diagrams that show a meter data management method in which a gateway device stores meter data according to an embodiment of the present invention.
Figure 11:
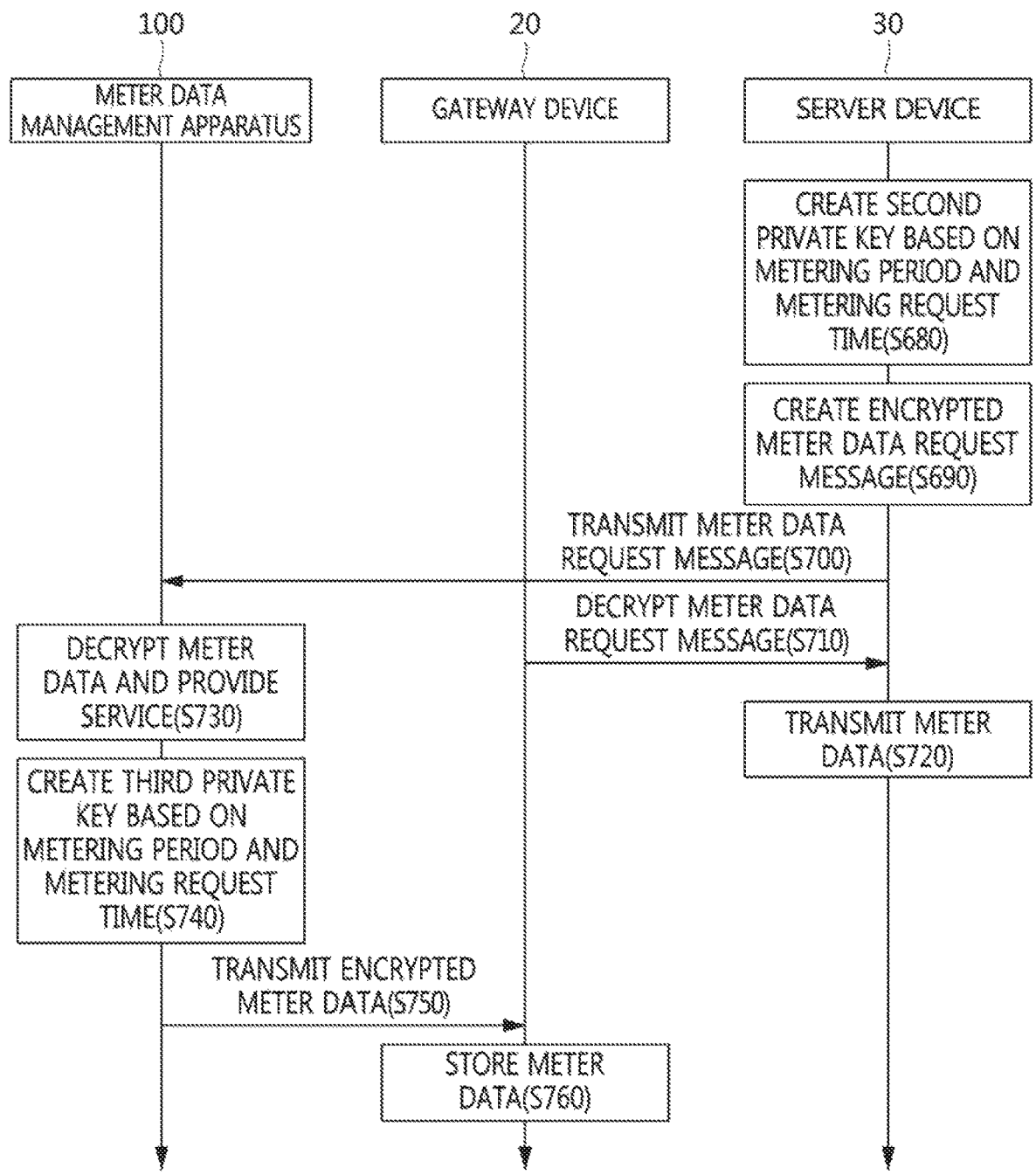

FIG. 10 and FIG. 11 are sequence diagrams that show a meter data management method in which a gateway device stores meter data according to an embodiment of the present invention.

Referring to FIG. 10, in the meter data management method according to an embodiment of the present invention, first, a registration request message may be transmitted at step S510.

That is, the meter data management apparatus 100 may transmit a registration request message to the server device 30 at step S510.

Here, the meter data management apparatus 100 may create a registration request message for registering itself in the server device 30 at step S510.

Here, at step S510, the meter data management device 100 may create a registration request message that includes the address of a destination, the address of an origin, and the identifier of the meter data management apparatus 100, which is the unique information thereof.

Here, the registration request message may further include information about the amount of memory for storing meter data in the gateway device 20.

The information about the amount of memory may be used as a reference when the server device 30 sets a metering period to be included in a registration completion message or a meter data request message.

Also, in the meter data management method according to an embodiment of the present invention, an initial private key may be created at step S520.

That is, at step S520, the server device 30 may create an initial private key using the identifier of the meter data management apparatus 100, which is acquired from the registration request message.

Here, the server device 30 may acquire the identifier of the meter data management apparatus 100 at step S520 by receiving the registration request message.

Here, at step S520, the server device 30 may create an initial private key using the secret information about the server device 30 and the identifier of the meter data management apparatus 100, which is included in the registration request message.

Here, the server device 30 may register the meter data management apparatus 100 at step S520 by checking the identifier of the meter data management apparatus 100, which is included in the registration request message.

Here, the initial private key created by the server device 30 may match the initial private key created by the security unit 120 of the meter data management apparatus 100.

Accordingly, without the need to manage secret information of multiple meter data management apparatuses 100, the server device 30 may create a private key that matches the initial private key contained in each of the meter data management apparatuses 100 using the secret information thereof and the identifier of each of the meter data management apparatuses 100 received therefrom at step S520.

Also, in the meter data management method according to an embodiment of the present invention, an encrypted registration completion message may be created at step S530.

That is, at step S530, the server device 30 may create a registration completion message in which first time information is encrypted using the initial private key.

Here, at step S530, the server device 30 may create a registration completion message in which the metering period and the metering start time included in the first time information are encrypted using the initial private key.

Here, the metering period may be set depending on service characteristics or information about the amount of memory for storing meter data in the gateway device 20, which is included in the registration request message.

Here, at step S530, the metering period may be set to be inversely proportional to the amount of memory for storing meter data in the gateway device 20.

For example, at step S530, the larger the amount of memory in the gateway device 20, the shorter the metering period may be set. Conversely, the smaller the amount of memory in the gateway device 20, the longer the metering period may be set.

Also, at step S530, the metering period may be set to be inversely proportional to a change in the amount of electricity consumed by the target device 10 depending on the service characteristics.

For example, at step S530, the larger the change in the amount of electricity consumed by the target device 10, the shorter the metering period may be set. Conversely, the smaller the change in the amount of electricity consumed by the target device 10, the longer the metering period may be set.

For example, the metering period may be set in units of minutes to, for example, one minute, five minutes, ten minutes, fifteen minutes, thirty minutes, sixty minutes, or the like.

Also, in the meter data management method according to an embodiment of the present invention, the encrypted registration completion message may be transmitted at step S540.

That is, the server device 30 may transmit the created registration completion message to the meter data management apparatus 100 at step S540.

Also, in the meter data management method according to an embodiment of the present invention, the registration completion message may be decrypted at step S550.

That is, the meter data management apparatus 100 may decrypt the registration completion message, received from the server device 30, using the initial private key at step S550.

Here, the meter data management apparatus 100 may acquire the first time information at step S550 by decrypting the registration completion message.

Here, at step S550, the meter data management apparatus 100 may acquire meter data from the target device using the metering period and the metering start time of the first time information, which are acquired by decrypting the registration completion message.

Also, in the meter data management method according to an embodiment of the present invention, the meter data management apparatus 100 may create a first private key at step S560.

That is, at step S560, the meter data management apparatus 100 may create a first private key by taking the metering period and the metering start time, included in the first time information, as input, the first time information being acquired by decrypting the registration completion message.

Also, in the meter data management method according to an embodiment of the present invention, meter data may be encrypted and transmitted at step S570.

That is, at step S570, the meter data management apparatus 100 may encrypt meter data, which are read at time intervals of the metering period of the first time information from the metering start time, using the first private key, and may transmit the encrypted meter data to the gateway device 20.

Also, in the meter data management method according to an embodiment of the present invention, the meter data may be stored at step S580.

That is, at step S580, the gateway device 20 may store the meter data received from the meter data management apparatus 100.

Also, in the meter data management method according to an embodiment of the present invention, the server device 30 may create a first private key at step S590.

That is, at step S590, the server device 30 may create a first private key by taking the metering period and the metering start time, included in the first time information, as input, the first time information being acquired by decrypting the registration completion message.

Here, step S590 may be performed before step S550.

Also, in the meter data management method according to an embodiment of the present invention, an encrypted meter data request message may be created at step S600.

That is, the server device 30 may create a first meter data request message in which second time information is encrypted using the first private key at step S600.

Here, at step S600, the server device 30 may create a first meter data request message in which the metering period and the first metering request time included in the second time information are encrypted using the first private key.

Here, at step S600, the server device 30 may set the metering period of the second time information to be the same as that of the first time information, which is set at step S530, or may change the metering period.

That is, at step S600, the metering period may be set by changing the previous metering period depending on the characteristics of the metering service to be provided or information about the amount of memory for storing meter data in the gateway device 20, which is included in the registration request message.

Here, at step S600, the metering period may be set to be inversely proportional to the amount of memory for storing meter data in the gateway device 20.

For example, at step S600, the larger the amount of memory in the gateway device 20, the shorter the metering period may be set. Conversely, the smaller the amount of memory in the gateway device 20, the longer the metering period may be set.

Also, at step S600, the metering period may be set to be inversely proportional to a change in the amount of electricity consumed by the target device 10 depending on the service characteristics.

For example, at step S600, the larger the change in the amount of electricity consumed by the target device 10, the shorter the metering period may be set. Conversely, the smaller the change in the amount of electricity consumed by the target device 10, the longer the metering period may be set.

For example, the metering period may be set in units of minutes to, for example, one minute, five minutes, ten minutes, fifteen minutes, thirty minutes, sixty minutes, or the like.

Also, in the meter data management method according to an embodiment of the present invention, the meter data request message may be transmitted at step S610.

That is, the server device 30 may transmit the created first meter data request message to the meter data management apparatus 100 at step S610.

Also, in the meter data management method according to an embodiment of the present invention, the meter data request message may be decrypted at step S620.

That is, the meter data management apparatus 100 may decrypt the first meter data request message, received from the server device 30, using the first private key at step S620.

Here, the meter data management apparatus 100 may acquire the second time information at step S620 by decrypting the first meter data request message.

Here, at step 620, the meter data management apparatus 100 may acquire the metering period and the first metering request time included in the second time information by decrypting the first meter data request message.

Here, at step S620, when the metering period is determined to be changed as the result of comparison of the metering period of the first time information with that of the second time information, the metering period of the second time information may be selected.

Here, at step S620, when the new metering period is set, the meter data management apparatus 100 may acquire meter data based on the new metering period.

Also, in the meter data management method according to an embodiment of the present invention, the meter data may be transmitted at step S630.

That is, at step S630, the meter data management apparatus 100 may request the gateway device 20 to transmit first meter data, in which meter data from the metering start time of the first time information to the first metering request time of the second time information are encrypted and saved, to the server device 30.

Here, at step S630, the gateway device 20 may transmit the first meter data, in which meter data from the metering start time of the first time information to the first metering request time of the second time information are encrypted and saved, to the server device 30.

Also, in the meter data management method according to an embodiment of the present invention, the first meter data may be decrypted at step S640.

That is, the server device 30 may decrypt the encrypted first meter data, received from the gateway device 20, using the first private key at step S640.

Here, the first meter data may be meter data read from the metering start time to the first metering request time.

Here, because the first meter data are encrypted by the meter data management apparatus 100 using the first private key, which is created by taking the metering period and the metering start time as input, the server device 30 may decrypt the encrypted first meter data using the first private key at step S640.

Here, the server device 30 may provide users with a metering service using the decrypted first meter data at step S640.

Also, in the meter data management method according to an embodiment of the present invention, the meter data management device 100 may create a second private key at step S650.

That is, the meter data management apparatus 100 may create a second private key at step S650 by taking the metering period and the first metering request time, included in the second time information, as input, the second time information being acquired by decrypting the first meter data request message.

Here, step S650 may be performed before step S640.

Here, at step S650, the meter data management apparatus 100 may acquire meter data based on a new metering period when the new metering period is selected. That is, when the metering period of the first time information is determined to differ from that of the second time information, meter data may be acquired based on the metering period of the second time information.

Also, in the meter data management method according to an embodiment of the present invention, meter data may be encrypted and transmitted at step S660.

That is, at step S660, the meter data management apparatus 100 may encrypt meter data, acquired at time intervals of the metering period of the second time information from the first metering request time, using the second private key, and may transmit the encrypted meter data to the gateway device 20.

Also, in the meter data management method according to an embodiment of the present invention, the encrypted meter data may be stored at step S670.

That is, at step S670, the gateway device 20 may store the encrypted meter data received from the meter data management apparatus 100.

Referring to FIG. 11, in the meter data management method according to an embodiment of the present invention, the server device 30 may create a second private key at step S680.

That is, at step S680, the server device 30 may create a second private key by taking the metering period and the first metering request time, included in the second time information, as input.

Also, in the meter data management method according to an embodiment of the present invention, an encrypted meter data request message may be created at step S690.

That is, at step S690, the server device 30 may create a second meter data request message in which third time information is encrypted using the second private key.

Here, at step S690, the server device 30 may create a second meter data request message in which the metering period and the second metering request time included in the third time information are encrypted using the second private key.

Here, at step S690, the server device 30 may set the metering period of the third time information to be the same as that of the second time information, which is set at step S600, or may change the metering period.

That is, at step S690, the metering period may be set by changing the previous metering period depending on the characteristics of the metering service to be provided or information about the amount of memory for storing meter data in the gateway device 20, which is included in the registration request message.

Here, at step S690, the metering period may be set to be inversely proportional to the amount of memory for storing meter data in the gateway device 20.

For example, at step S690, the larger the amount of memory in the gateway device 20, the shorter the metering period may be set. Conversely, the smaller the amount of memory in the gateway device 20, the longer the metering period may be set.

Also, at step S690, the metering period may be set to be inversely proportional to a change in the amount of electricity consumed by the target device 10 depending on the service characteristics.

For example, at step S690, the larger the change in the amount of electricity consumed by the target device 10, the shorter the metering period may be set. Conversely, the smaller the change in the amount of electricity consumed by the target device 10, the longer the metering period may be set.

For example, the metering period may be set in units of minutes to, for example, one minute, five minutes, ten minutes, fifteen minutes, thirty minutes, sixty minutes, or the like.

Also, in the meter data management method according to an embodiment of the present invention, the meter data request message may be transmitted at step S700.

That is, the server device 30 may transmit the created second meter data request message to the meter data management apparatus 100 at step S700.

Also, in the meter data management method according to an embodiment of the present invention, the meter data request message may be decrypted at step S710.

That is, the meter data management apparatus 100 may decrypt the second meter data request message, received from the server device 30, using the second private key at step S710.

Here, the meter data management apparatus 100 may acquire the third time information at step S710 by decrypting the second meter data request message.

Here, at step S710, the meter data management apparatus 100 may acquire the metering period and the second metering request time included in the third time information by decrypting the second meter data request message.

Here, at step S710, when the metering period is determined to be changed as the result of comparison of the metering period of the second time information with that of the third time information, the metering period of the third time information may be selected.

Here, at step S710, when the new metering period is set, the meter data management apparatus 100 may acquire meter data based on the new metering period.

Also, in the meter data management method according to an embodiment of the present invention, the meter data may be transmitted at step S720.

That is, at step S720, the meter data management apparatus 100 may request the gateway device 20 to transmit second meter data, in which meter data from the first metering request time of the second time information to the second metering request time of the third time information are saved, to the server device 30.

Here, at step S720, the gateway device 20 may transmit the second meter data, in which meter data from the first metering request time of the second time information to the second metering request time of the third time information are saved, to the server device 30.

Also, in the meter data management method according to an embodiment of the present invention, the meter data may be decrypted at step S730.

That is, the server device 30 may decrypt the encrypted second meter data, received from the gateway device 20, using the second private key at step S730.

Here, the second meter data may be meter data read from the first metering request time to the second metering request time.

Here, because the second meter data are encrypted by the meter data management apparatus 100 using the second private key, which is created by taking the metering period and the second metering request time as input, the server device 30 may decrypt the encrypted second meter data using the second private key at step S730.

Here, at step S730, the server device 30 may provide users with a metering service using the decrypted second meter data.

Also, in the meter data management method according to an embodiment of the present invention, a third private key may be created at step S740.

That is, at step S740, the meter data management apparatus 100 may create a third private key by taking the metering period and the second metering request time, included in the third time information, as input, the third time information being acquired by decrypting the second meter data request message.

Here, step S740 may be performed before step S730.

Here, at step S740, the meter data management apparatus 100 may acquire meter data based on a new metering period when the new metering period is selected. That is, when the metering period of the second time information is determined to differ from that of the third time information, meter data may be acquired based on the metering period of the third time information.

Also, in the meter data management method according to an embodiment of the present invention, meter data may be encrypted and transmitted at step S750.

That is, at step S750, the meter data management apparatus 100 may encrypt meter data, acquired at time intervals of the metering period of the third time information from the second metering request time, using the third private key, and may transmit the encrypted meter data to the gateway device 20.

Also, in the meter data management method according to an embodiment of the present invention, the encrypted meter data may be stored at step S760.

That is, at step S760, the gateway device 20 may store the encrypted meter data received from the meter data management apparatus 100.

In the meter data management method, when the meter data management apparatus 100 and the server device 30 respectively create new private keys at the same time, the new private keys may be the same as each other.

Also, in the meter data management method, the meter data management apparatus 100 and the server device 30 may use an operation mode that includes confidentiality and message authentication using a lightweight symmetric key cryptography algorithm.

For example, in the meter data management method, the meter data management apparatus 100 and the server device 30 may provide only confidentiality or both confidentiality and integrity depending on the resources of a smart meter in the lowest layer and on the data transmission speed thereof.

Accordingly, in the meter data management method, encrypted meter data stored in the meter data management apparatus 100 or the gateway device 20 may include the identifier of the meter data management apparatus 100, the date and time at which meter data are read, and information about electricity consumption.

For example, meter data may be configured in the form of "Enc[smart meter ID (SM_ID)||the date and time at which meter data are read (YYMMDD-HHMM)∥electricity consumption]", and may further include an integrity value.

Also, in the meter data management method, the server device 30 may create a new private key whenever it transmits a new meter data request message to the meter data management apparatus 100, and the meter data management apparatus 100 may create a new private key whenever it receives the new meter data request message through the above-described steps S680 to S760.

That is, in the meter data management method according to an embodiment of the present invention, steps S680 to S760 may be repeatedly performed, whereby meter data may be securely protected using a private key newly created in response to a request by the server device 30 and meter data may be optimally acquired using a changed metering period.

Figure 12:
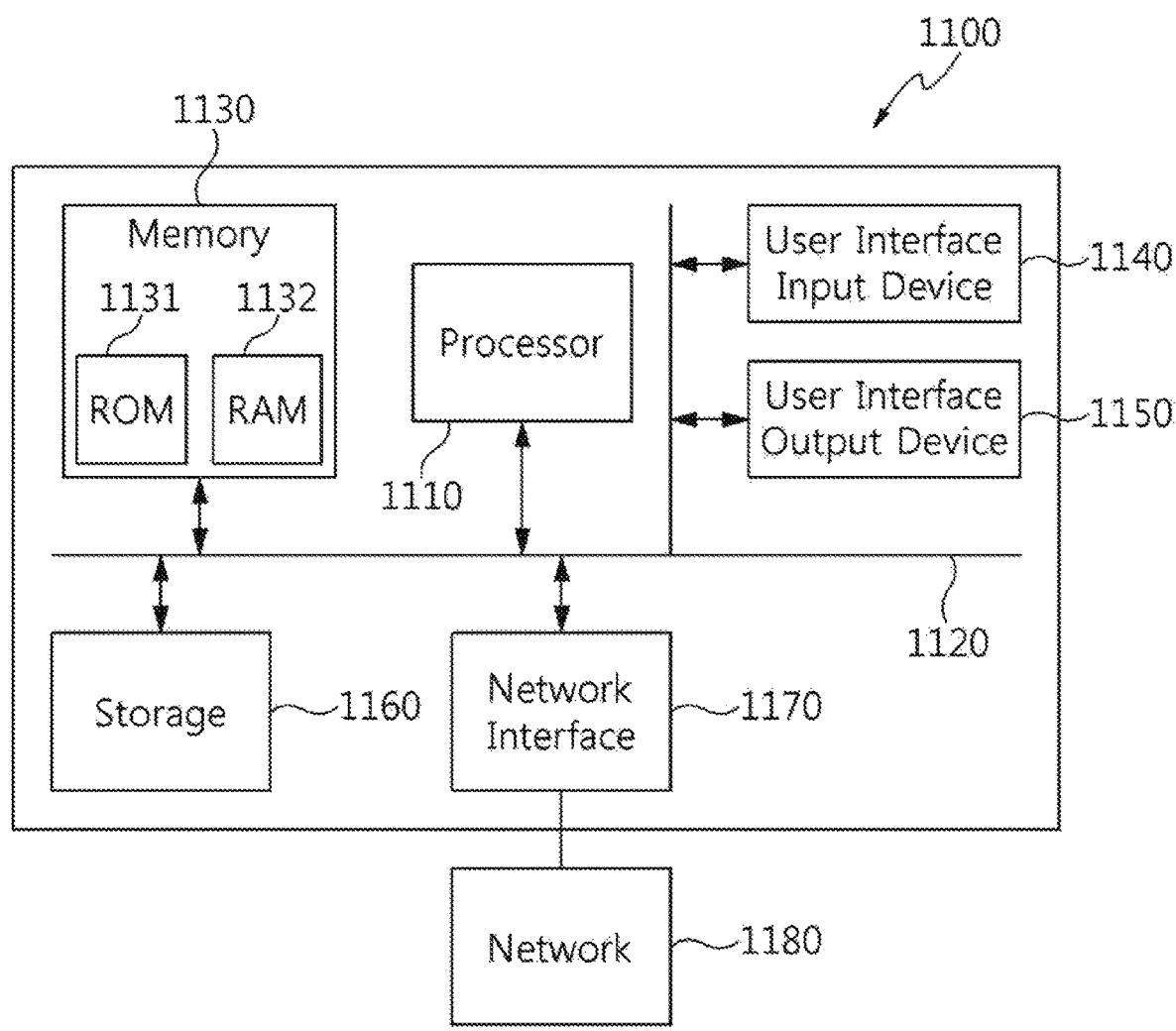
FIG. 12 is a block diagram that shows a computer system according to an embodiment of the present invention.

FIG. 12 is a block diagram that shows a computer system according to an embodiment of the present invention.

Referring to FIG. 12, the target device 10, the gateway device 20, the server device 30, and the meter data management apparatus 100 according to an embodiment of the present invention may be implemented in a computer system 1100 including a computer-readable recording medium. As illustrated in FIG. 12, the computer system 1100 may include one or more processors 1110, memory 1130, a user interface input device 1140, a user interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

According to the present invention, end-to-end security between a device in the lowest layer and a device in the highest layer may be guaranteed, and information may be prevented from being leaked to third parties.

Also, according to the present invention, a device in the lowest layer may encrypt sensitive and important data, such as private information and the like, before the data are stored, and may transmit the encrypted data to a device in the highest layer, whereby data stored in the devices may be securely protected.

Also, according to the present invention, secure encryption and decryption functions may be provided in the state in which a device in the highest layer does not manage keys for respective devices in the lowest layer.

Also, according to the present invention, meter data may be securely protected using a private key that is newly created in response to a request by a device in the highest layer, and meter data may be optimally acquired using an updated metering interval.

As described above, the apparatus and method for managing meter data according to the present invention are not limitedly applied to the configurations and operations of the above-described embodiments, but all or some of the embodiments may be selectively combined and configured, so that the embodiments may be modified in various ways.

What is claimed is:

1. A method for managing meter data, in which a meter data management apparatus is used, comprising the steps of:
   acquiring first time information by decrypting an encrypted message received from a server device;
   acquiring meter data from a target device using the first time information;
   creating a first private key using the first time information at both the meter data management apparatus and the server;
   encrypting the meter data using the first private key;
   acquiring second time information by decrypting an encrypted metering request message, which is received from the server device; and
   transmitting the encrypted meter data based on the first time information and the second time information to the server device, wherein the encrypted meter data is decrypted using the first private key and providing a user with a metering service using the decrypted first meter data,
   wherein acquiring the first time information is configured such that
   the meter data management apparatus creates a registration request message that includes an identifier thereof and transmits the registration request message to the server device, and
   the server device creates an initial private key that is identical to an initial private key stored in advance in the meter data management apparatus using the identifier included in the registration request message.

2. The method of claim 1, wherein acquiring the first time information is configured to create a registration completion message in which the first time information is encrypted using the initial private key.

3. The method of claim 2, wherein acquiring the first time information is configured such that the server device creates the registration completion message so as to include a metering period of the first time information, which is created based on at least one of an amount of memory in a device for storing meter data and a change in usage by the target device.

4. The method of claim 3, wherein acquiring the meter data is configured to acquire the meter data from the target device from a metering start time of the first time information.

5. The method of claim 4, wherein creating the first private key is configured such that the meter data management apparatus and the server device create the same first private key by taking the first time information as input.

6. The method of claim 5, wherein creating the first private key is configured to create the first private key by taking the metering period and the metering start time of the first time information as input.

7. The method of claim 6, wherein acquiring the second time information is configured such that the server device creates the metering request message in which a metering period and a metering request time of the second time information are encrypted using the first private key.

8. The method of claim 7, wherein acquiring the second time information is configured such that the server device creates the metering request message so as to include the metering period of the second time information, which is created based on at least one of the amount of memory in the device for storing meter data and the change in usage by the target device.

9. The method of claim 8, wherein acquiring the second time information is configured such that the meter data management apparatus selects the metering period of the second time information when a metering period is determined to be changed as a result of comparison of the metering period of the first time information with that of the second time information.

10. The method of claim 9, wherein transmitting the meter data is configured to transmit the meter data read from the metering start time of the first time information to the metering request time of the second time information.

11. A method for managing meter data, in which a meter data management apparatus is used, comprising the steps of:

acquiring time information by decrypting an encrypted message received from a server device;

transmitting first meter data of a target device to the server device based on the time information;

creating a private key using the time information at both the meter data management apparatus and the server device; and encrypting second meter data, acquired from the target device, using the private key;

transmitting the encrypted second meter data to the server device, wherein the encrypted second meter data is decrypted using the second private key and providing a user with a metering service using the decrypted second meter data, wherein acquiring the time information is configured such that the server device creates the encrypted message including the time information using an initial private key and transmits the encrypted message to the meter data management apparatus; and the meter data management apparatus acquires the time information by decrypting the encrypted message using an initial private key stored in advance, which is identical to the initial private key created by the server device, wherein acquiring the time information is configured such that the server device creates the encrypted message so as to include a metering period of the time information, which is created based on at least one of an amount of memory in a device for storing meter data and a change in usage by the target device.

12. The method of claim 11, wherein transmitting the first meter data is configured to transmit the first meter data, read by a metering request time of the time information, to the server device.

13. The method of claim 11, wherein encrypting the second meter data is configured to encrypt the second meter data, which are acquired from the target device after the private key is created, using the private key.

14. The method of claim 12, wherein creating the private key is configured to acquire the second meter data from the target device using the metering period of the time information when a metering period is determined to be changed as a result of comparison of the metering period of the time information with a metering period that is used when the first meter data are acquired.

15. The method of claim 14, wherein creating the private key is configured to create the private key by taking as input at least one of the metering period and the metering request time of the time information.

16. An apparatus for managing meter data, comprising:

a metering unit for acquiring meter data from a target device based on time information;

a communication unit for receiving a message including the time information from a server device and transmitting the meter data to the server device;

a security unit for creating a private key using the time information and encrypting the meter data using the private key; and a meter data storage device for storing the meter data, wherein acquiring the time information is configured such that the server device creates the encrypted message including the time information using the private key and transmits the encrypted message to the communication unit; and the security unit acquires the time information by decrypting the encrypted message using the private key stored in advance, which is identical to the private key created by the server device, wherein acquiring the time information is configured such that the server device creates the encrypted message so as to include a metering period of the time information, which is created based on at least one of an amount of memory in the meter data storage device and a change in usage by the target device.

* * * * *